March 3, 1936.  C. A. BUTTON  2,032,399
VEHICLE WHEEL TESTING INSTRUMENT
Filed Dec. 7, 1931
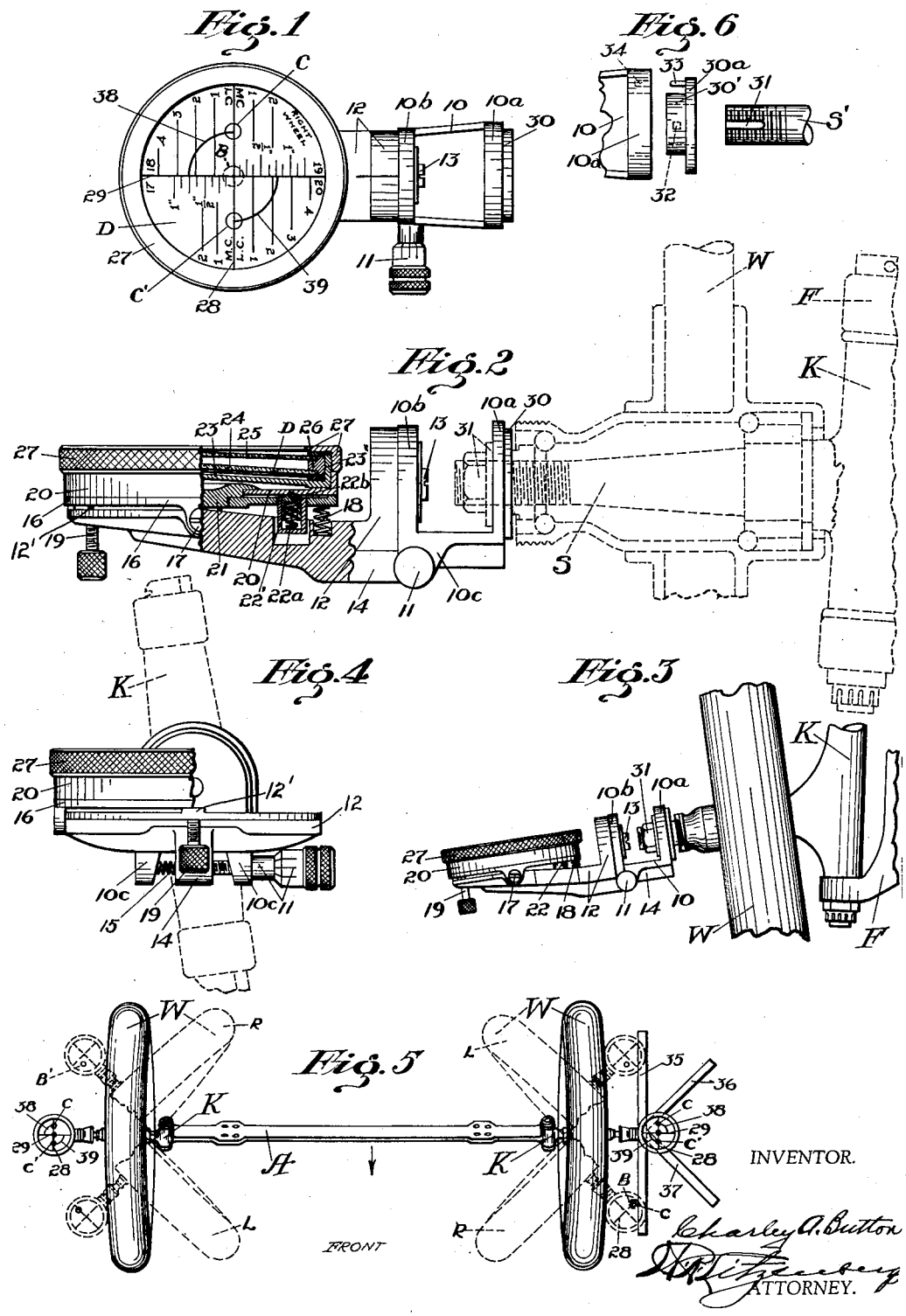
INVENTOR.
Charley A. Button
ATTORNEY.

Patented Mar. 3, 1936

2,032,399

UNITED STATES PATENT OFFICE 2,032,399

VEHICLE WHEEL TESTING INSTRUMENT

Charley A. Button, Arcadia, Calif.

Application December 7, 1931, Serial No. 579,476

7 Claims. (Cl. 33—203)

My invention relates to vehicle wheel testing instruments, designed for the purpose of indicating the camber of a wheel, the king pin inclination laterally of the vehicle, the caster of the axle, the turning radius of the wheels, and also the wear of king pin and bushings and related parts which affect the normal positions of the front wheels of the vehicle, and it has among its salient objects: to provide an instrument, one of which can be attached to the spindle of each front wheel and never removed therefrom until all of the readings above specified have been made; to provide an instrument of the character referred to which is scientifically accurate and which can be adjusted for various purposes without being removed from the spindle; and, in general, to provide a practical, efficient and economical instrument of the character referred to.

It is known that the alinement of the front wheels of an automobile is dependent upon the four factors above enumerated and that these are so inter-related that when one of said factors is inaccurate, the other factors are affected thereby, and sometimes a slight variation in one of said factors results in a magnified inaccuracy in one or more of the other factors. It is the purpose of my invention to be able to accurately test the wheels and spindles and king-pins of the front wheels in a way which will make it possible to properly rectify any disorder of either or both of said front wheels.

Other objects and purposes of my invention will be discovered from the following description of my invention, taken in connection with the accompanying sheet of drawings showing one practical embodiment thereof, and in which,—

Figure 1 is a plan view of an instrument embodying my invention;

Figure 2 is a side elevation thereof, with parts shown in section, and also indicating how it is attached to the spindle of a wheel;

Figure 3 is a side elevation of my invention attached to the spindle of a wheel, and showing the relative angular relationships of the wheel and the knuckle;

Figure 4 is an end view thereof, with parts broken away;

Figure 5 is a plan view of a front axle, showing both wheels provided with my invention, and indicating in light broken lines the different adjustments of the wheels in turning;

Figure 6 shows certain details of parts which are used in attaching my invention to the end of a spindle.

Referring now in detail to the drawing, I will first describe the instrument itself and then its use in connection with a wheel spindle. A supporting member or yoke 10 is provided, having an outer part 10$^a$, and an inner part 10$^b$, with opposite, downwardly projecting portions, as 10$^c$, to receive a micrometer, for a purpose again referred to.

Pivotally connected to the inner part 10$^b$, is an L-shaped supporting member 12, having one face bearing against the face of the inner member 10$^b$, and secured rotatably thereto by means of a screw bolt 13, in axial alinement with the parts 10$^a$ and 10$^b$. Formed as a part of said L-shaped member 12, is a fin-like portion 14, moving between the projecting portions 10$^c$, 10$^c$, and connected to be moved by means of said micrometer 11. A coiled spring 15 is placed between said fin-like member 14 and the portion 10$^c$, at the left in Fig. 4, while the micrometer 11 operates against the opposite side of said fin-like portion 14, for adjusting said L-shaped member about its axis as represented by the screw bolt 13.

Pivotally mounted upon said L-shaped member 12, is a carrier table 16, rocking on a pivot pin at 17, said table being raised at one side by means of a small coiled spring 18, and the opposite side of which rests upon a stop 12' on the member 12, and is moved by means of a screw 19, against the tension of the spring 18, as will be clear from Figs. 2 and 3.

Rotatably mounted upon said carrier table 16, is a turn table member 20, held in place by a central overlying screw member 21, screwed into the center of said carrier table 16, and overlying said turn table, whereby to permit the latter to be turned. A spring pressed stop plunger mechanism, as 22, is used to frictionally hold said turn table member 20 in different positions of adjustment about its axis, said mechanism 22 consisting of a cup 22', with spring 22$^a$, and plunger 22$^b$, adapted to engage or seat in suitable indents in the underside of said table 20. Said turn table member 20, has seated therein a circular bubble level composed of a bottom member 23, having its outer edge upturned as at 23', and held firmly in said member 20, with two spaced, upwardly convexed, members 24 and 25, secured together in spaced relationship by means of a ring member 26, adapted to fit snugly in the bottom member 23—23', the outer upper portion of said member 23' being externally threaded to receive an annular confining member 27. Said spaced transparent members 24 and 25 have between them a suitable oil or other liquid to provide a bubble, designated B. It will thus be seen that the circular level as a whole can be turned with the members 20 and 27, that it can be rocked on the axis at 17, and that it can also be adjusted by means of the micrometer about the axis represented by the screw bolt 13. It will be understood that the upper convexed member 25 is of transparent material.

I will now describe the dial graduations or markings, referring particularly to Figs. 1 and 2. This dial is designated D, and may be secured to the underside of the bottom member 24, as indicated by the line D, said member 24 being transparent, or it could be etched or otherwise made directly upon said members 24 or 25 to be read in connection with the bubble between said members. The dial is shown divided into four sections or segments by lines 28 and 29, and said lines are divided by marks as 1, 2, 3 and 4, designating degrees, or by the light division lines in inches. This is shown for the reason that some of the specifications for the older vehicles are given in inches, while most of the specifications are now given in degrees. Two instruments, as shown in Fig. 1, are used, one for the right wheel and one for the left wheel, as indicated also on each dial. By the use of a convexed level, with its capacity and adjustments for making readings in all directions, all readings can be made with the same dial and the same instrument, thereby reducing the necessary equipment to a minimum.

The indications "M. C." and "L. C." appearing on the dial mean "more caster" and "less caster" and are used in setting the relationship between camber and caster. The small circles c and c', indicated on the line 28 are used as "stops" to govern the amount the wheels are turned in making tests of caster and turning radius. Also placed upon the dial are the numbers 17, 18, 19 and 20, indicating the particular part of the dial or graduations to be used with wheels of these respective sizes, that is, a wheel rim or felly which is 17, 18, 19 or 20 inches in diameter would be included.

The instrument is attached to the outer end of a wheel spindle, designated S, by means of a bushing 30, placed in the outer part 10ª of the supporting yoke 10, as indicated in Figs. 1 and 2, and through which the end of the spindle S, is inserted with a washer and nut at 31, secured upon the end of the spindle, between the parts 10ª and 10ᵇ. The bushing 30 is shown on the spindle S and is clamped against the ball bearing elements by the nut 31. Said bushing could be threaded on the spindle. The spindle S is carried by a knuckle K, hingedly supported in the fork F, of the axle A. The wheel and tire are designated together as W.

In Fig. 6, I have shown a modified method of attaching the supporting yoke 10, to the end of the spindle, here designated S' and provided with a vertical slot 31. Instead of the bushing 30, I have shown a special bushing 30', having a stud 32 in its inner top adapted to fit into the slot 31, thus properly relating said bushing to the spindle S'. Said bushing is also provided with a pin 33, in its flange 30ª, and said pin is positioned to fit into a socket 34 provided in the face of the yoke part 10ª, whereby the supporting yoke 10 for the instrument is properly related to the bushing and the spindle.

I have also shown in Fig. 5, a cooperating testing tool in the form of the letter K, the members of which are designated, respectively, 35, 36 and 37. When the tool is placed upon the floor with the member 35 parallel with the wheel, shown in full lines, the turning radius of the wheel will bring the wheel in parallel relationship with the members 36 or 37, as indicated in light broken lines. This K-tool being made of iron and being accurate, provides a very effective tool or gauge to be used in connection with the instrument secured to the wheel spindle, as will be further explained in the use and operation part of this specification to follow.

The use and operation of my invention may be briefly described as follows:

Method of attaching

Assume that an instrument is attached to the end of each spindle as indicated in Figure 2 and also shown in Figure 5 of the drawing.

Camber reading

We first desire to determine the camber of the wheels. Screw 19 is first lowered to a position whereby all pressure of screw 19 against carrier table 16 is removed, thereby permitting carrier table 16 to rest, at its outer edge on the raised portion of L shaped member 12, designated as automatic stop 12'. The instrument is so constructed that when carrier table 16 rests on stop 12', in the event spindle S were horizontal, bubble "B" would intersect line 28, but in the event a camber angle exists, bubble "B" will record the camber angle by its position on either side of line 28. The micrometer is now used as an adjusting means for the purpose of rotating the instrument on axis 13 to locate the bubble along line 29, thereby recording the camber angle by the position of the bubble away from line 28 and on line 29.

Removal of camber reading from the instruments

Before proceeding to the reading of the other factors, it is first necessary that the camber reading above described be removed from the instrument, in order that there may be no confusion between the camber reading that has been made and subsequent readings of other factors to be made, and also to avoid the necessity of the operator calculating a deduction to allow for the camber reading. It is an important feature of these instruments that the camber reading can thus be removed. This is accomplished by the use of screw 19 which, having been previously lowered for the camber reading, is now turned clockwise thereby contacting carrier table 16 and lifting carrier table 16 upwards and away from stop 12' and against the spring pressure of spring 18 on axis 17. By this means bubble "B" is caused to travel along line 29 until it intersects line 28, and then, by using the micrometer 11 as an adjusting means, bubble "B" is caused to move along line 28 to the intersection of lines 28 and 29, i. e. centered—and we are ready to proceed with the other readings.

King pin inclination reading

We next read the inclination of king pin "K" and this is accomplished by first turning the entire level assembly contained on and in turn table member 20 around the central screw 21 a one quarter turn, for the purpose of placing the graduations in the opposite direction, that is, the opposite direction to the position in which they were for the camber reading. The accuracy of the one quarter turn is accomplished by the location of a "stop" which coincides with spring press stop plunger mechanism, 22.

With the wheels "W" straight forward and bubble "B" at the intersection of lines 28 and 29 which lines have now been interchanged in position because of the one quarter turn aforesaid, we now turn wheel "W" as shown in Figure 5, 30 degrees in either direction away from straight forward position. This will cause bubble "B" to travel away from the starting point and the distance bubble "B" moves away from line 28 in its new position occasioned by the one quarter turn of the dial, as shown by the graduations on the dial, is the first step in measurement of king pin inclination. The distance bubble "B" moves away from line 29 is of no concern in this instance. Wheel "W" is now returned to its original straight forward position and bubble "B" is at its original starting point at the intersection of lines 28 and 29.

We now turn wheel "W" 30 degrees in the opposite direction to which it was first turned and bubble "B" will again move away from line 28 but in the direction opposite to the direction it travelled in the first turn. The distance bubble "B" has travelled away from line 28, as shown by the graduations on the dial, with no concern for the position of bubble "B" as related to line 29, is the second step of measurement of king pin inclination. A turn of wheel "W" of thirty degrees has been made in each direction from straight forward position and bubble "B" has travelled two distances, one for each thirty degree turn. The total of the two distances bubble "B" travels from line 28, as shown by the graduations on the dial, is the inclination of the king pin on the side being read.

Rotation of spindle

These instruments being rigidly attached to the spindles, are subject to the same fluctuating movements as the spindles themselves when rotating on their axes. As the king pin is the axis of the spindle, the outer end of the spindle when revolved on the king pin, fluctuates from a true horizontal plane and prescribes an arc of an ellipse, if camber and king pin inclination are present. Any deviation of the spindle from the true horizontal plane is reflected in the instrument by the movement of bubble "B".

Sixty degree segment-basis of measurement

Due to the construction of automobile front end assemblies it is impossible to make a ninety degree turn of the front wheels, consequently, in lieu thereof, an aggregate turn of sixty degrees, or two turns of thirty degrees each in opposite directions from the straight forward position of the wheel, provides the same results as though a ninety degree turn in one direction were possible from the same starting point, the purpose being to measure the angle of the axis of an ellipse, the king pin being the axis and the arc prescribed by the outer end of the spindle being the ellipse.

Comparative king pin inclination reading

In addition to the above king pin inclination reading, wherein wheel "W" is turned an aggregate of sixty degrees, it is possible to make a comparative king pin inclination reading, that is, a comparison of the angle of one king pin with the angle of the other king pin, to make certain they have an identical angle, or to determine any deviation in the respective angles, which may or may not indicate the exact degree of inclination at which they are set in the axle. This reading is accomplished by the same method heretofore described, the two king pins being read simultaneously but the measurement of the turn of wheels "W" from a straight forward position not required. In lieu of said measurement of turns, if bubble "B" is started at the same place on each dial, according to the graduations, and using the micrometer as a means to cause the bubble "B" to be located at an extreme edge of the dial, but on a graduation line arbitrarily selected, the same on both sides, with the wheels in an extreme turned position, then by turning the wheels their extreme limit in the opposite direction, the distance each bubble "B" travels across the respective dials, according to the graduations on the dials should be identical, and if not, the deviation or differential indicates a difference in the angles of the two king pins, which angles should be identical for the proper operation of the vehicle.

Caster reading

We next determine the caster of the axle,—the level assemblies are now turned back to their original positions—that is a one quarter turn back. With the wheels in a straight forward position I center bubble "B" on both instruments by using micrometer 11 and screw 19 as adjusting means. Bubble "B" now rests at the intersection of lines 28 and 29. Wheels "W" are next turned away from a straight forward position as though making a left turn, which results in the right hand wheel making the larger arc of the turn, 30 degrees, and which will cause bubble "B" on the right wheel, to move away from the intersection of lines 28 and 29 on the right wheel gauge, along line 28 or to either side thereof. We now record the deviation of bubble "B" from line 28, according to the graduations on the dial. Wheels "W" are now returned to their original straight forward position and bubble "B" rests again at the intersection of lines 28 and 29. Right wheel "W" is now turned away from a straight forward position, as though making a right turn, which results in the left wheel making the larger arc of the turn, 30 degrees, and the right wheel, which is being read, making the inside or smaller arc of the turn.

We now record the position of bubble "B" from line 28, bubble "B" now being on the opposite side of line 29, to which it was in the first step of this reading above given, which recordation is again made according to the graduations on the dial, indicating the deviation of bubble "B" away from line 28. Having made two turns of wheels "W" and two recordations of the distance bubble "B" is away from line 28 on each turn, the following formula is then applied to determine the caster angle on the side being read.

Caster calculation formula

If bubble "B" travels on opposite sides of line 28 for each turn, that is, on one turn to the right of line 28 and on the other turn to the left of line 28, the total of the two recordations of distances bubble "B" travels away from line 28 in opposite directions is the caster of the side being read.

If bubble "B" does not travel on opposite sides of line 28 for each turn, that is, on both turns bubble "B" travels away from line 28 on the same side of line 28, then the difference between the two recordations is the caster of the side being read.

The total or net distance bubble "B" travels, according to the graduations on the dial, on an arc represented by a total 60 degree turn of each wheel "W", away from line 28, either in one or both directions therefrom, is the caster angle on the side being read.

Combination relative reading

The above method describes the manner in which the caster of the axle is read, by making the readings as above prescribed on both ends of the axle, which readings should be identical if the axle is true. By the use and operation of these instruments, it is possible, however, due to the fact that all factors are read by the same instrument, to make a combination reading of camber, caster, and king pin inclination to determine the relation and balance of one factor to the other.

The manufacturers of motor vehicles have built into their products specified front end assembly settings, which are practically universal, wherein the caster angle is so arranged in combination with the camber angle and king pin inclination angle that the wheel on the larger or outer turn, that is the right wheel on a left turn, or the left wheel on a right turn, maintains its original straight forward camber angle during a portion of the turn when said wheel makes the outer or larger arc. This likewise indicates that the outer end of the spindle on the outside wheel travels on a plane horizontal to the surface on which the vehicle is travelling, for that portion of the arc. These instruments are so designed that the measurement of such portion of the turn is determined by the fact that bubble "B" starting from its original position at the intersection of lines 28 and 29 travels rearwardly from said intersection along line 28 until bubble "B" coincides with small circle "C" on line 28, and this indicates the proper amount of turn for this purpose. If bubble "B", on the above mentioned turn, does not follow line 28 and deviates therefrom, it indicates an improper caster angle in combination with the existing camber and king pin angles, and the amount of correction required to bring about a proper balance of the caster angle in combination with the other two angles, is shown by the position of bubble "B" on the dial, either on the side marked "M. C." or "L. C." which indicates are "more caster required" or "less caster required" and the amount required for either correction will be shown by the position of bubble "B" and the graduations on the dial. This relationship reading is in lieu of an actual caster reading and facilitates the testing of the angles in combination and with a view of determining if the vehicle has retained the combination of factors originally intended by the manufacturer, which factors are subject to change from their original positions due to the use of the vehicle.

Research discloses that certain manufacturers have different settings of these combinations, and as a method of applying the above method of combination test, dial assembly may be rotated on center screw, until cross lines 28 and 29 occupy an oblique position, in accordance with manufacturers' specifications, which exact positions may be built into the instruments and controlled by "stops" which coincide with spring press stop plunger mechanism, 22.

Turning radii reading

The next operation is to determine the accuracy of the turning radii of the wheels. The inside wheel on a turn rotates farther than the outside wheel, that is, it turns away from a straight forward position a greater distance in degrees than the wheel making the outer turn or larger arc. At no point of the turn are both wheels in unison, as relates to the number of degrees both have turned away from a straight forward position. Therefore I desired to determine the exact differential of the turns of the respective wheels.

The wheels of the vehicle are again placed in a straight forward position and bubble "B" centered at the intersection of lines 28 and 29. As the wheels are rotated, as if in making a turn, any deviation from a straight forward position is reflected in each wheel separately by the movement of bubble "B" away from its starting point, and the wheel which rotates the further will cause bubble "B" in the instrument on its side, to move further than the bubble in the other instrument.

By the use of these instruments, the method of determining the differential in turning radii is as follows—

The wheels are now turned away from straight forward, as if making a right turn, until bubble "B" intersects arc 39 on the instrument on the right front wheel. By the bubble travelling the distance from its starting point (the intersection of lines 28 and 29) to intersect arc 39, a fixed measured turn of that wheel, from straight forward has been accomplished. We now observe the position of the bubble in the other instrument, which, if it has intersected arc 38 indicates that the other wheel has travelled the same distance from straight forward on a turn. If, however, the bubble in the instrument on the other wheel does not intersect arc 38, we then turn micrometer causing said bubble "B" to intersect arc 38 and the number of intervals, on the micrometer, required to cause bubble "B" to intersect arc 38 is the differential of the turning radius on the side on which the micrometer adjustment was used. The micrometer is now returned to its original position, the wheels again returned to their straight forward position, and the operation repeated as to the other wheel. If the differential is the same on both sides and in accordance with wheel bases and relative turning radii the test indicates the correctness of the turning radius of the vehicle.

Thus I have provided a simple, but accurate and practical instrument which can be used to determine the several factors so vital to the proper alinement of the front wheels of a vehicle, and while I have shown and described in detail one practical embodiment of my invention, I am aware that changes can be made in details of construction and arrangement without departing from the spirit thereof, and I do not, therefore, limit the invention to the showing made for descriptive purposes, except as I may be limited by the hereto appended claims.

I claim:

1. A vehicle wheel testing instrument including a support adapted to be attached to the spindle of a wheel in axial alinement therewith, a bubble level adjustable on said support and having a graduated convex dial, means for adjusting said level, the moving element of said level moving in relation to said dial in any direction, and said dial being graduated to indicate deviation from the level about axes at right angles to each other.

2. A vehicle wheel testing instrument including a support adapted to be attached to the spindle of a wheel in axial alinement therewith, a round convex level adjustably mounted upon said support, said level having means therein providing a bubble, a graduated dial associated with said level and said bubble and readable in connection therewith, the graduations of the dial being arranged in sector divisions, said level being mounted to be turned about its axis, and means for rocking said level on its support about axes at right angles to each other.

3. A vehicle wheel testing instrument including a support adapted to be attached to the end of a spindle of a wheel and in axial alinement therewith, a round level rotatably mounted thereon, and supported to be rocked about horizontal axes at right angles to each other, said level having a chamber of spherical form, a dial having graduations arranged thereon in different sectors thereof and readable with relation to said level, said level having a movable element therein and moving relative to said dial graduations, and means for adjusting and holding said level in different positions of adjustment.

4. In an instrument of the character referred to, a supporting member, a carrier table mounted thereon, a turn table upon said carrier table, a round level instrument with convexed bubble chamber and bubble therein mounted upon said turn table and turning therewith, means for frictionally holding said turn-table in different positions of adjustment about its axis, a dial with graduations arranged to be read in connection with said bubble, and means for adjusting said carrier table and said instrument about axes at right angles to each other to position the bubble of said level, to indicate the desired reading.

5. In an instrument of the character referred to, a support, a round level instrument with convexed bubble chamber and bubble therein, said level instrument being mounted on said support and made adjustable about axes at right angles to each other, a dial with graduations marking degrees thereon to be read in connection with the position of said bubble, and a micrometer for moving said support, said micrometer having graduations thereon for determining the movement of said dial about one of the axes.

6. An instrument of the character shown and described including a supporting member adapted to be attached to the spindle of a wheel in axial alinement therewith, a second supporting member rotatably connected with said first supporting member and rotatable about an axis in axial alinement with the axis of said first supporting member and said spindle; a round bubble level rotatably mounted upon said second supporting member and rotatable about its own axis, at right angles to the axis of said supporting members, said bubble level having graduations arranged along lines at right angles to each other and readable in connection with the bubble of said level, whereby said bubble level can be turned to different positions about the axes of its supporting means to indicate different results as to wheel conditions.

7. An instrument of the character referred to including a supporting member mounted to be adjusted about a horizontal axis, a round level body mounted thereon and adjustable about said horizontal axis with said support, a micrometer for adjusting said supporting member and said level about said horizontal axis, means for adjusting said level upon said support about an axis at right angles to said horizontal axis of said support, said level having a liquid chamber with a bubble therein, said chamber being of spherical form, and a dial associated with said level with graduations in directions at right angles to each other.

CHARLEY A. BUTTON.